UNITED STATES PATENT OFFICE.

PHILIPP MÜLLER, OF FRANKFORT-ON-THE-MAIN, GERMANY.

MANUFACTURE OF ALIMENTARY PRODUCTS.

1,080,920.     Specification of Letters Patent.     Patented Dec. 9, 1913.

No Drawing.     Application filed March 7, 1910. Serial No. 547,771.

*To all whom it may concern:*

Be it known that I, PHILIPP MÜLLER, merchant, residing at Wingertstrasse 3, Frankfort-on-the-Main, Germany, have invented new and useful Improvements in the Manufacture of Alimentary Products, of which the following is a specification.

It has been found that in carrying out the process described in Patent No. 863081 of August 13, 1907 for the manufacture of alimentary products, suitable for constant use, from buttermilk, flour and sugar, the time (about six weeks) required for storing the intermediate product can be shortened or dispensed with if a certain quantity of cane sugar be added to the buttermilk before the latter has been soured. The storage described in the patent before named had for effect to bring about the complete conversion of the cane sugar and of the lime still remaining in combination with the casein after the souring of the buttermilk, and thus improved the digestibility and suitability of the food. According to the present invention this complete conversion of the original constituents of the food can also be effected by adding cane sugar to the buttermilk before the latter has been completely soured, for the reason that the lactic fermentation (souring) then proceeds in presence of a larger quantity of sugar (*i. e.* milk sugar and cane sugar).

In consequence of the cane sugar being subjected to the process of fermentation which occurs in the buttermilk, the liability of the food to undergo fermentation during its passage through the alimentary canal is also considerably lessened; this result being the same as that produced by the prolonged storage of the intermediate product, according to the method described in the patent already mentioned. Hence, the intermediate product, obtained by subsequent treatment in the manner described in that patent can now be evaporated to dryness without the necessity for further storage.

The phenomenon described above as resulting from the addition of cane sugar previous to the souring of the buttermilk is also found to ensue when whole milk or skim milk is used in place of buttermilk.

The following example illustrates how the process of this invention is carried out, if the desired alimentary product is to be used as a food for infants: To 1 liter milk approximately 60 grams of cane sugar are added before the milk has been completely soured. This mixture of milk and sugar is then subjected to souring. If the acidification has not advanced further than 5 degrees according to Thoerner's scale (See *Chemikerzeitung*, 1892, No. 80, and *Milchzeitung*, 1893, page 58), 15 grams of flour are added and the mixture obtained in this manner is then heated and boiled under constant stirring, then poured, at a temperature of about 90 degrees centigrade, into previously sterilized vessels and, when the vessels have been closed, heated for a short time (say for 10 minutes) at a temperature of 100 degrees centigrade. This heating (sterilization) has for its object to render the percentage of acid in the milk unalterable and giving a fixed and unchanging composition to the mixture so that it can be desiccated and stored without the risk of any appreciable chemical change taking place in the same manner as is the case in the process of the said U. S. Patent 863081 but without the storage of about 6 weeks. The process described may also be performed in such a way that during the boiling of the mixture of milk, cane sugar and flour, sugar may again be added and the mixture boiled again.

If the desired alimentary food is to be used for feeding young animals (such for example as calves and suckling pigs) the amount of the flour and sugar to be added must be suitably modified so that it may correspond with the natural food of these suckling animals.

Having thus described my invention, what I claim and desire to secure by Letters Patent, is—

1. The herein described process for the manufacture of an alimentary product which consists in adding cane sugar to milk, souring the milk, mixing the resulting product with flour, heating and boiling the mixture, then subjecting the product to sterilization in a closed vessel, substantially as and for the purpose described.

2. The herein described process for the manufacture of an alimentary product which consists in adding cane sugar to milk from which the fat has been removed, souring the milk, mixing the resulting product with flour, heating and boiling the mixture, then subjecting the product to sterilization in a closed vessel, substantially as and for the purpose described.

3. The herein described process for the manufacture of an alimentary product which consists in adding cane sugar to buttermilk, souring the milk, mixing the resulting product with flour, heating and boiling the mixture, then subjecting the product to sterilization in a closed vessel, substantially as and for the purpose described.

4. The herein described process for the manufacture of an alimentary product which consists in adding cane sugar to milk from which the fat has been removed, souring the milk, mixing the resulting product with flour, heating and boiling the mixture, adding sugar during the heating operation and subjecting the product to sterilization in a closed vessel, substantially as and for the purpose described.

5. The herein described process for the manufacture of an alimentary product which consists in adding cane sugar to buttermilk, souring the milk, mixing the resulting product with flour, heating and boiling the mixture, adding sugar during the heating operation and subjecting the product to sterilization in a closed vessel, substantially as and for the purpose described.

6. The herein described process for the manufacture of an alimentary product which consists in adding cane sugar to milk from which the fat has been removed, souring the milk, mixing the resulting product with flour, heating and boiling the mixture, adding sugar during the heating operation, boiling the mixture repeatedly, subjecting the product to sterilization in a closed vessel, storing the sterilized product in a closed vessel and then evaporating to dryness, substantially as and for the purpose described.

7. The herein described process for the manufacture of an alimentary product which consists in adding cane sugar to buttermilk, souring the milk, mixing the resulting product with flour, heating and boiling the mixture, adding sugar during the heating operation, boiling the mixture repeatedly, subjecting the product to sterilization in a closed vessel, storing the sterilized product in a closed vessel and then evaporating to dryness, substantially as and for the purpose described.

In testimony, that I claim the foregoing as my invention I have signed my name in presence of two witnesses, this 12th day of February 1910.

PHILIPP MÜLLER.

Witnesses:
RUDOLPH FRICKE,
ALBERT ROSMANN.